United States Patent
Dong

(10) Patent No.: US 12,513,741 B2
(45) Date of Patent: Dec. 30, 2025

(54) SUB-CHANNEL REQUEST METHOD, SUB-CHANNEL INDICATION METHOD AND DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 366 days.

(21) Appl. No.: 18/019,463

(22) PCT Filed: Aug. 24, 2020

(86) PCT No.: PCT/CN2020/110910
§ 371 (c)(1),
(2) Date: Feb. 2, 2023

(87) PCT Pub. No.: WO2022/040888
PCT Pub. Date: Mar. 3, 2022

(65) Prior Publication Data
US 2023/0292362 A1    Sep. 14, 2023

(51) Int. Cl.
*H04W 74/00* (2009.01)
*H04W 74/04* (2009.01)
*H04W 74/08* (2009.01)

(52) U.S. Cl.
CPC ....... *H04W 74/04* (2013.01); *H04W 74/0866* (2013.01)

(58) Field of Classification Search
None
See application file for complete search history.

(56) References Cited

U.S. PATENT DOCUMENTS

| 10,716,066 B2 | 7/2020 | Huang et al. |
| 2019/0098565 A1* | 3/2019 | Cherian ............... H04W 48/16 |

(Continued)

FOREIGN PATENT DOCUMENTS

| CN | 110875805 A | 3/2020 | |
| EP | 3706358 A1 * | 9/2020 | ........... H04L 5/0053 |
| WO | WO-2016123403 A1 * | 8/2016 | ........... H04L 5/0007 |

OTHER PUBLICATIONS

Indian Patent Application No. 202347012281, Office Action dated Nov. 1, 2023, 5 pages.

(Continued)

*Primary Examiner* — Gerald A Smarth
(74) *Attorney, Agent, or Firm* — Cozen O'Connor

(57) ABSTRACT

A method for requesting a subchannel is applied to a station, and includes sending a target wake time (TWT) request frame to an access point in an operating channel. The number of bytes in a first TWT channel field in the TWT request frame is greater than 1, and the first TWT channel field indicates the subchannel selected by the station in a candidate channel. A method for indicating a subchannel is applied to an access point, and includes sending a TWT response frame to a station in an operating channel. The number of bytes in a second TWT channel field in the TWT response frame is greater than 1, and the second TWT channel field indicates the subchannel selected by the station in a candidate channel.

18 Claims, 11 Drawing Sheets

---

S101 sending a TWT request frame to an access point in an operating channel, in which the number of bytes in a first TWT channel field in the TWT request frame is greater than 1, and the first TWT channel field indicates the subchannel selected by the station in a candidate channel

S102 receiving a TWT response frame returned by the access point according to the TWT request frame, in which the number of bytes in a second TWT channel field in the TWT response frame is greater than 1, and the second TWT channel field indicates the subchannel selected by the station in the candidate channel

(56) References Cited

U.S. PATENT DOCUMENTS

2019/0246354 A1    8/2019  Huang et al.
2021/0250858 A1*   8/2021  Chen ................. H04W 72/0446

OTHER PUBLICATIONS

European Patent Application No. 20950563.5, Search and Opinion dated Mar. 4, 2024, 9 pages.
Yongho Seok et al., "EHT SST Operation", Doc. No. IEEE 802.11-20/0736r0, Jun. 11, 2020, 19 pages.
PCT/CN2020/110910 English translation of International Search Report dated May 20, 2021, 2 pages.

* cited by examiner

FIG. 1

S101: sending a TWT request frame to an access point in an operating channel, in which the number of bytes in a first TWT channel field in the TWT request frame is greater than 1, and the first TWT channel field indicates the subchannel selected by the station in a candidate channel

FIG. 2

| Element ID | Length | Control | TWT Parameter Information |
|---|---|---|---|

FIG. 3

| Request Type | Target Wake Time | TWT Group Assignment | Nominal Minimun TWT Wake Duration | TWT Channel | NDP Paging |
|---|---|---|---|---|---|

FIG. 4

S101: sending a TWT request frame to an access point in an operating channel, in which the number of bytes in a first TWT channel field in the TWT request frame is greater than 1, and the first TWT channel field indicates the subchannel selected by the station in a candidate channel S102: receiving a TWT response frame returned by the access point according to the TWT request frame, in which the number of bytes in a second TWT channel field in the TWT response frame is greater than 1, and the second TWT channel field indicates the subchannel selected by the station in the candidate channel

SUB-CHANNEL REQUEST METHOD, SUB-CHANNEL INDICATION METHOD AND DEVICE

CROSS-REFERENCE TO RELATED APPLICATIONS

The present application is a National Stage of International Application No. PCT/CN2020/110910, filed on Aug. 24, 2020, the contents of all of which are incorporated herein by reference in their entireties for all purposes.

TECHNICAL FIELD

The present disclosure relates to a field of communication technology, and more particularly to a method for requesting a subchannel, a method for indicating a subchannel, an electronic device and a non-transitory computer-readable storage medium.

BACKGROUND

In the existing IEEE802.11ax protocol, a maximum bandwidth of a supported channel is 160 MHz. As users place increasing demands for service on the network, the bandwidth of 160 MHz is no longer able to meet user requirements. In the IEEE802.11be protocol, it is proposed that a channel with a bandwidth greater than 160 MHz, such as 320 MHz may be used. However, some technical problems arise.

SUMMARY

According to a first aspect of embodiments of the present disclosure, a method for requesting a subchannel is provided. The method for requesting the subchannel is applied to a station and includes sending a target wake time (TWT) request frame to an access point in an operating channel. The number of bytes in a first TWT channel field in the TWT request frame is greater than 1, and the first TWT channel field indicates the subchannel selected by the station in a candidate channel.

According to a second aspect of embodiments of the present disclosure, a method for indicating a subchannel is provided. The method for indicating the subchannel is applied to an access point and includes sending a TWT response frame to a station in an operating channel. The number of bytes in a second TWT channel field in the TWT response frame is greater than 1, and the second TWT channel field indicates the subchannel selected by the station in a candidate channel.

According to a third aspect of embodiments of the present disclosure, an electronic device is provided. The electronic device includes a processor; and a memory for storing instructions executable by the processor. The processor is configured to execute the executable programs to perform operations of the method for requesting the subchannel according to the embodiments of the first aspect of the present disclosure and/or the method for indicating the subchannel according to the embodiments of the second aspect of the present disclosure.

According to a fourth aspect of embodiments of the present disclosure, a non-transitory computer-readable storage medium is provided. The computer-readable storage medium has stored therein executable programs that, when executed by a processor, cause the processor to perform operations of the method for requesting the subchannel according to the embodiments of the first aspect of the present disclosure and/or the method for indicating the subchannel according to the embodiments of the second aspect of the present disclosure.

BRIEF DESCRIPTION OF THE DRAWINGS

In order to clearly illustrate the technical solutions in embodiments of the present disclosure, the accompanying drawings used in description for the embodiments will be briefly introduced below. The drawings in the following description only show some embodiments of the present disclosure. For those skilled in the art, other drawings may also be obtained according to these drawings without any creative effort.

FIG. 1 is a flowchart of a method for requesting a subchannel implemented in a station, according to an embodiment of the present disclosure.

FIG. 2 is a schematic diagram illustrating a format of a TWT element according to an embodiment of the present disclosure.

FIG. 3 is a schematic diagram illustrating a format of a TWT parameter setting field according to an embodiment of the present disclosure.

FIG. 4 is a flowchart of a method for requesting a subchannel according to another embodiment of the present disclosure.

DETAILED DESCRIPTION

Figure 5:
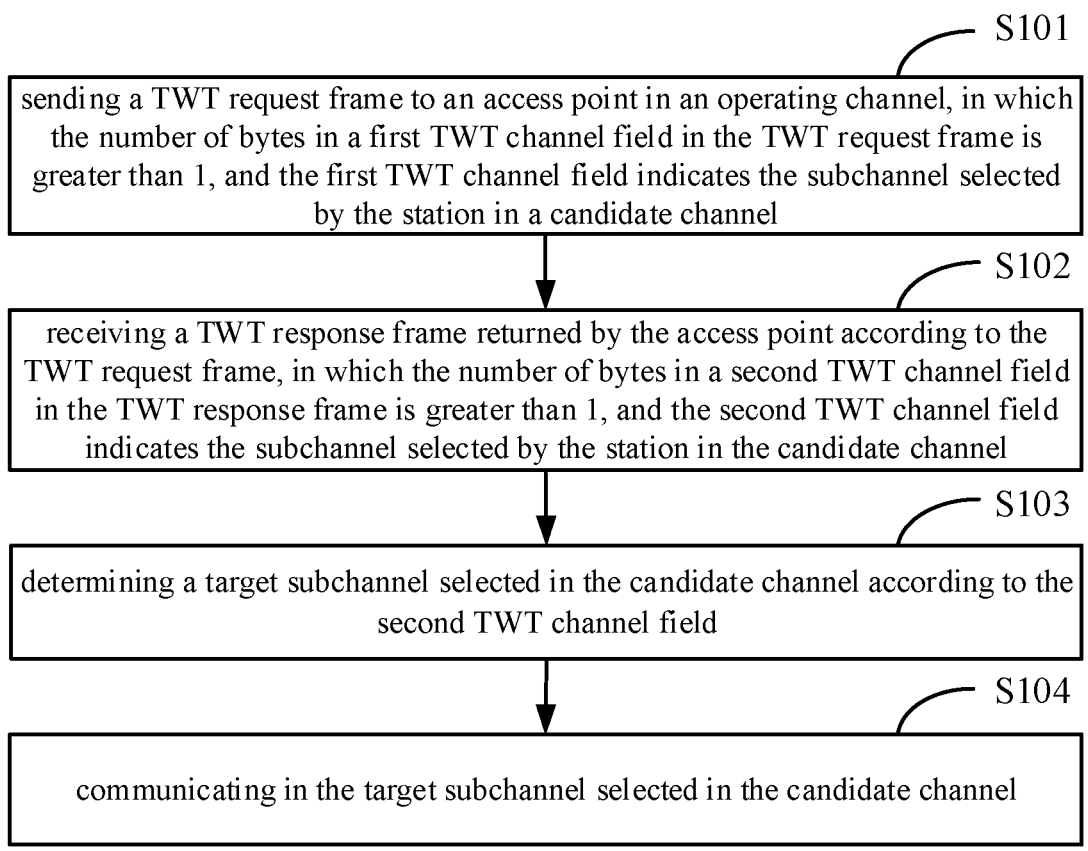
FIG. 5 is a flowchart of a method for requesting a subchannel according to a further embodiment of the present disclosure.

The following will clearly and completely describe the technical solutions in embodiments of the present disclosure with reference to the accompanying drawings in embodiments of the present disclosure. The described embodiments are only some of embodiments of the present disclosure, not all embodiments of the present disclosure. Based on embodiments of the present disclosure, all other embodiments obtained by those skill in the art without making creative works belong to the protection scope of the present disclosure.

FIG. 1 is a flowchart of a method for requesting a subchannel according to an embodiment of the present disclosure. The method for requesting the subchannel shown in embodiments may be applied to stations, and the stations include, but are not limited to, electronic devices such as mobile phones, tablet computers, wearable devices, sensors, and Internet of Things devices. The station may serve as a user equipment to communicate with an access point. The access point includes, but is not limited to, a switch, a router, and the like. In an embodiment, the access point may be an access point applied to the method for indicating the subchannel described in any of the following embodiments.

As shown in FIG. 1, the method for requesting the subchannel may include the following operation.

In block S101, a target wake time (TWT) request frame is sent to an access point in an operating channel. The number of bytes in a first TWT channel field in the TWT request frame is greater than 1, and the first TWT channel field indicates the subchannel selected by the station in a candidate channel.

In the TWT mechanism, for the operation of the subchannel selective transmission (SST), a TWT channel field of 1 byte (i.e., 8 bits) is used to identify the subchannel channel selected. For a channel having a bandwidth greater than 160 MHz, the number of subchannels divided from the channel may be more than 8. For example one channel may be divided into subchannels with a bandwidth of 20 MHz. However, it is difficult for the existing TWT channel field to accurately indicate selection of a subchannel from more than 8 subchannels.

In an embodiment, the operating channel is a channel currently used by the station to communicate with the access point. In the operating channel, the station and the access point may perform TWT interaction to negotiate which subchannel to be selected in the candidate channel. The candidate channel refers to a channel that is not the operating channel, that is, a channel not used by the station and the access point for the current communication.

In an embodiment, for the SST operation, the bandwidth of the subchannel selected by the access point in the candidate channel is same as the bandwidth of the operating channel. For example, if the bandwidth of the operating channel is 20 MHz, the bandwidth of the subchannel in the candidate channel is 20 MHz. For example, in a case where the maximum bandwidth is 320 MHz, if a bandwidth of the operating channel is 20 MHz, a bandwidth of the candidate channel is 300 MHz, which includes 15 subchannels with a bandwidth of 20 MHz.

In an embodiment, in the TWT mechanism, the station may periodically negotiate with the access point via the operating channel to determine the subchannel to be used for a subsequent communication.

Embodiments of the present disclosure further provides a method for requesting a subchannel.

The method for requesting the subchannel shown in the embodiments may be applied to stations, and the stations include, but are not limited to, electronic devices such as mobile phones, tablet computers, wearable devices, sensors, and Internet of Things devices. The station may serve as a user equipment to communicate with an access point. The access point includes, but is not limited to, a switch, a router, and the like. In an embodiment, the access point may be an access point that performs a method for indicating a subchannel according to any embodiment described hereafter. The method for requesting the subchannel may include the following operation.

In block S101', a TWT request frame is sent to an access point in an operating channel. The TWT request frame at least includes a first field for indicating at least one corresponding subchannel group and/or a second field for indicating the subchannel in the at least one subchannel group.

In some embodiments, the maximum channel bandwidth may be greater than 80 MHz. For example, the maximum channel bandwidth is 160 MHz, 240 MHz, 320 MHz or other values. In some embodiments of the present disclosure, the TWT request frame may indicate at least one subbandwidth group in N subbandwidth groups (N≥2) in the maximum channel bandwidth, and may further indicate M subbandwidth (M≥1) in the at least subbandwidth group. In some embodiments, for example, the maximum channel bandwidth is 320 MHz (that is, the sum of the bandwidth of the operating channel and the bandwidth of the candidate channel is 320 MHz), and the TWT request frame indicates at least one subbandwidth group in N (=8) subbandwidth groups, and parameters of M (=2) subbandwidths included in the at least one subbandwidth group, where each subbandwidth is 20 MHz. In some embodiments, the subbandwidth parameter of each subbandwidth group is same as each other, so that only 3 bits may be used to indicate the subbandwidth parameter of each of the N (=8) subbandwidth groups. For example, in a related art, the maximum channel bandwidth is 80 MHz, and a field may be used to indicate multiplexing of these subbandwidth parameters. For example, in order to support the maximum channel bandwidth up to 320 MHz, 2 bits may be used to indicate the multiplexing of the subbandwidth parameter of 80 MHz. That is, 00 represents that there is only one 80 MHz subbandwidth group, and the maximum channel bandwidth is 80 MHz. 01 represents that there are two 80 MHz subbandwidth groups, the maximum channel bandwidth is 80 MHz+80 MHz=160 MHz, and the two 80 MHz subbandwidth groups have the same configuration. 10 represents that there are three 80 MHz sub-bandwidth groups, and the maximum channel bandwidth is 80 MHz+80 MHz+80 MHz=240 MHz. 11 represents that there are four 80 MHz sub-bandwidth groups, and the maximum channel bandwidth is 80 MHz+80 MHz+80 MHz+80 MHz=320 MHz. In some embodiments, the maximum bandwidth of 240 MHz may be indicated by means of 80 MHz+160 MHz, that is, one field indicates an 80 MHz subbandwidth group, and the other field indicates a 160 MHz subbandwidth group. In some embodiments, the maximum bandwidth of 320 MHz may be indicated by 160 MHz+160 MHz. That is, one field indicates a 160 MHz subbandwidth group, and the other field indicates whether to multiplex this 160 MHz subbandwidth group (i.e., 1×160 MHz or 2×160 MHz).

That is, in the embodiments of the present disclosure, the bandwidth of the subchannel is one of 160 MHz, 80 MHz, 40 MHz or 20 MHz.

FIG. 2 is a schematic diagram of a format of a TWT element according to an embodiment of the present disclosure. As shown in FIG. 2, the format of the TWT element includes an element identification (ID), length information, control information, and TWT parameter information. The number of bytes of the TWT parameter information is variable and may be set according to actual conditions.

FIG. 3 is a schematic diagram of a format of a TWT parameter setting field according to an embodiment of the present disclosure.

As shown in FIG. 3, the TWT parameter information includes a plurality of fields, such as a request type, a target wake time, a TWT group assignment, and a TWT channel. The number of bytes of the TWT channel field is greater than 1, such as 1.5 bytes (i.e., 12 bits) or 2 bytes (i.e., 16 bits) and the like. That is, the TWT channel field may be any length greater than 8 bits, which is not limited to byte numbers listed above.

In an embodiment, when the station negotiates with the access point, the station may first send the TWT request frame to the access point, and the request frame includes the TWT element shown in FIG. 2 and FIG. 3.

The first TWT channel field indicates the subchannel to be selected in the candidate channel (requested by the station). Based on the first TWT channel field in the TWT request frame, the station may request to select the subchannel in the candidate channel, and the access point may determine the subchannel selected by the station in the candidate channel according to the first TWT channel field after receiving the TWT request frame.

According to the above-mentioned embodiments, since the number of bytes in the TWT channel field is greater than 1, for a bandwidth greater than 160 MHz, even if the bandwidth of the operating channel is small, the number of subchannels available for selection is relatively large (e.g., more than 8 subchannels are available for the SST), the use of the first TWT channel field can still accurately indicate the subchannel selected by the station, and the access point may accurately determine the subchannel selected by the station.

FIG. 4 is a flowchart of a method for requesting a subchannel according to another embodiment of the present disclosure. As shown in FIG. 4, the method includes the following operation.

In block S102, a TWT response frame returned by the access point according to the TWT request frame is received. The number of bytes in a second TWT channel field in the TWT response frame is greater than 1, and the second TWT channel field indicates the subchannel selected, by the station, in the candidate channel.

It is noted that the operation S102 in embodiments of the present disclosure may be implemented alone, or may be performed in combination with any operation in the embodiments of the present disclosure. For example, the operation S102 in the embodiments of the present disclosure may be performed in combination with the above-mentioned operation S101 or S101'.

In some embodiments, the second TWT channel field in the TWT response frame may have any length greater than 8 bits, which is not limited to the number of bytes listed above.

In an embodiment, after the access point receives the TWT request frame sent by the station, the access point may determine the TWT response frame according to the TWT request frame, and return the TWT response frame to the station and thus the station may receive the TWT response frame. In some embodiments, the access point may send the TWT response frame according to a preset rule or a protocol regulation. That is, triggering events for triggering to send the TWT response frame include, but are not limited to, receiving a TWT request frame, a trigger event determined according to a protocol, and a trigger event based on a preset rule.

Optionally, the first TWT channel field is same as the second TWT channel field, or the first TWT channel field is different from the second TWT channel field. Optionally, the channel configured to transmit the TWT request frame may be same as or different from the channel configured to transmit the TWT response frame.

In an embodiment, the access point may determine the second channel field in the TWT response frame by the following process.

The access point determines a reference subchannel requested by the station based on the first TWT channel field in the TWT request frame. In response to the reference subchannel being idle, the access point determines the second TWT channel field according to the first TWT channel field, and the first TWT channel field is same as the second TWT channel field. Alternatively, in response to the reference subchannel being busy, the access point selects an idle subchannel in the candidate channel as a target subchannel, and determines the second TWT channel field according to the target subchannel. The first TWT channel field is different from the second TWT channel field.

The format of the TWT element in the TWT response frame is similar to that of the TWT request frame, which will not be described in detail here. The TWT response frame carries the second TWT channel field. The number of bytes in the second TWT channel field is greater than 1, and the second TWT channel field indicates the subchannel selected by the station in the candidate channel.

In an embodiment, the station may receive the response frame returned by the access point. In the request frame sent by the station, the first TWT channel field indicate the reference subchannel selected by the station. After the access point receives the request frame, the access point does not directly assign the reference subchannel as the target subchannel to the station, but determines the target subchannel according to the state of the reference subchannel. Furthermore, the access point returns the response frame to the station, and the second TWT channel field in the response frame indicates the target subchannel selected.

FIG. 5 is a flowchart of a method for requesting a subchannel according to an embodiment of the present disclosure. As shown in FIG. 5, the method includes the following operations in blocks S103 and S104.

In block S103, a target subchannel selected in the candidate channel is determined according to the second TWT channel field.

It is noted that the operation S103 in the embodiment of the present disclosure may be implemented alone, or may be performed in combination with any operation in the embodiments of the present disclosure. For example, the operation S103 in the embodiment of the present disclosure may be performed in combination with the above-mentioned operation(s) selected from S101, S101', S102 or a combination thereof.

In an embodiment, after the station receives the response frame returned by the access point, the station may analyze the second TWT channel field in the response frame, and use the subchannel indicated by the second TWT channel field as the target subchannel selected.

In block S104, communication is performed in the target subchannel selected in the candidate channel.

It is noted that the operation S104 in the embodiment of the present disclosure may be implemented alone, or may be performed in combination with any operation in the embodiments of the present disclosure. For example, the operation S104 in the embodiment of the present disclosure may be performed in combination with the above-mentioned operation(s) selected from S101, S101', S102, S103 or any combination thereof.

In an embodiment, the station may perform a subsequent communication with the access point according to the target subchannel selected. For example, they may send data frames to each other.

For example, the communication between the station and the access point supports a bandwidth of up to 320 MHz. The bandwidth of the operating channel is 20 MHz, and the candidate channel is 300 MHz. Since 300/20=15, according to a position of the operating channel, there are at most 15 subchannels in the candidate channel as the available subchannels.

The reference subchannel selected by the station may be the first subchannel in the 15 subchannels, and the first TWT channel field may be "1000000000000000", the access point may determine that the first subchannel is selected in the 15 subchannels by the station according to the first TWT channel field. However, the reference subchannel requested by the station may be busy. In this case, the access point will further determine whether the reference subchannel is idle.

When the reference subchannel is idle, the access point allows the station to select the reference subchannel, and returns the TWT response frame to the station. The second TWT channel field is same as the first TWT channel field in the TWT response frame, i.e., is "1000000000000000". The station may select the first subchannel in the 15 subchannels for communication according to the second TWT channel field.

When the reference subchannel is not idle, the access point will not allow the station to select the reference subchannel. After the access point selects another idle subchannel as the target subchannel, the access point returns the TWT response frame to the station. The second TWT channel field in the TWT response frame is different from the first TWT channel field in the TWT response frame. For example, the second TWT channel field is "0100000000000000". The station may select the second subchannel in the 15 subchannels for communication according to the second TWT channel field.

Figure 6:
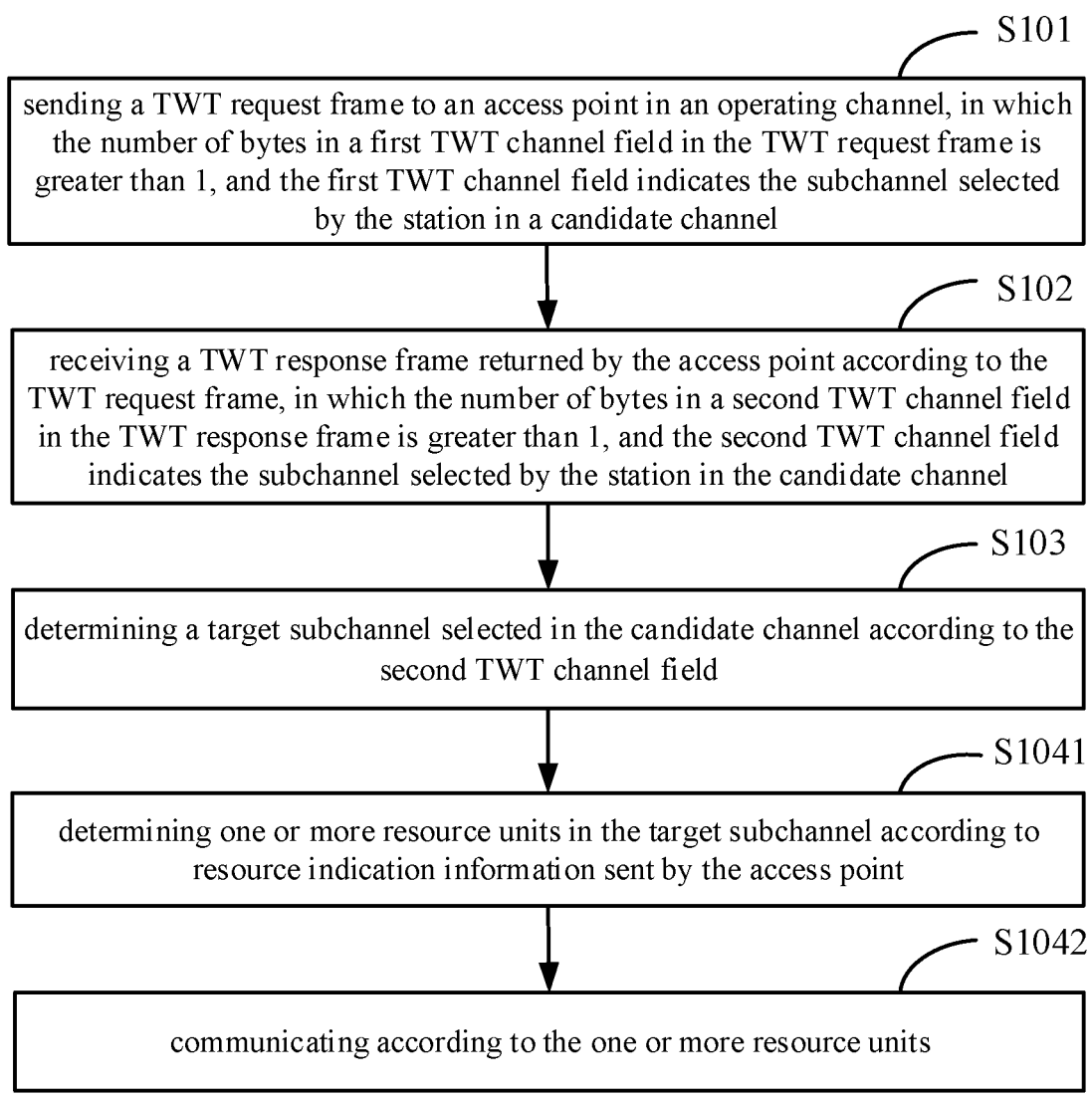
FIG. 6 is a flowchart of a method for requesting a subchannel according to a further embodiment of the present disclosure.

FIG. 6 is a flowchart of a method for requesting a subchannel according to a further embodiment of the present disclosure. As shown in FIG. 6, the station selects the target subchannel for communication in the candidate channel including the following operations.

In block S1041, one or more resource units in the target subchannel are determined according to resource indication information sent by the access point.

In block S1042, communication is performed according to the one or more resource units.

It is noted that the operations S1041 and S1042 in the embodiment of the present disclosure may be implemented independently or in combination with any operation in the embodiments of the present disclosure. For example, the operations S1041 and S1042 in the embodiment of the present disclosure may be performed in combination with the above-mentioned operation selected from S101, S101', S102, S103 or any combination thereof.

In an embodiment, the subchannel may include a plurality of resource units (RUs). The TWT request frame sent by the station may include a RU quantity and/or location requested. After the access point determines the target subchannel, the access point may select one or more RUs from the target subchannel for the station, and send resource indication information to the station. The resource indication information indicates the one or more RUs in the target subchannel that can be used by the station. Optionally, the resource indication information may be carried in the response frame returned by the access point.

For example, a subchannel with a bandwidth of 20 MHz may include 9 RUs. Each RU has a size of 26 subcarriers. Thus, after the station determines the target subchannel, the station may select one or more RUs for the station from the 9 RUs included in the target subchannel. In other embodiments, the subchannel may have another size, i.e., the number of the RUs, and the corresponding RU number may be variable, which may be determined through negotiation between the station and the access point. The above embodiments described are only examples, which shall not be construed to limit the present disclosure.

On this basis, after the station receives the resource indication information, the station may determine one or more resource units in the target subchannel according to the resource indication information sent by the access point, and performs communication according to the one or more resource units.

In an embodiment, a data frame sent by the station when the station interacts with the access point further includes a traffic identifier (TID). Optionally, a TID included in the data frame sent based on the operating channel may be same as or be different from a TID in the data frame sent after the target subchannel is determined according to the SST.

A process of the station determining the target subchannel according to the second TWT channel field will be described below with reference to FIG. 7.

Figures 7, 8:
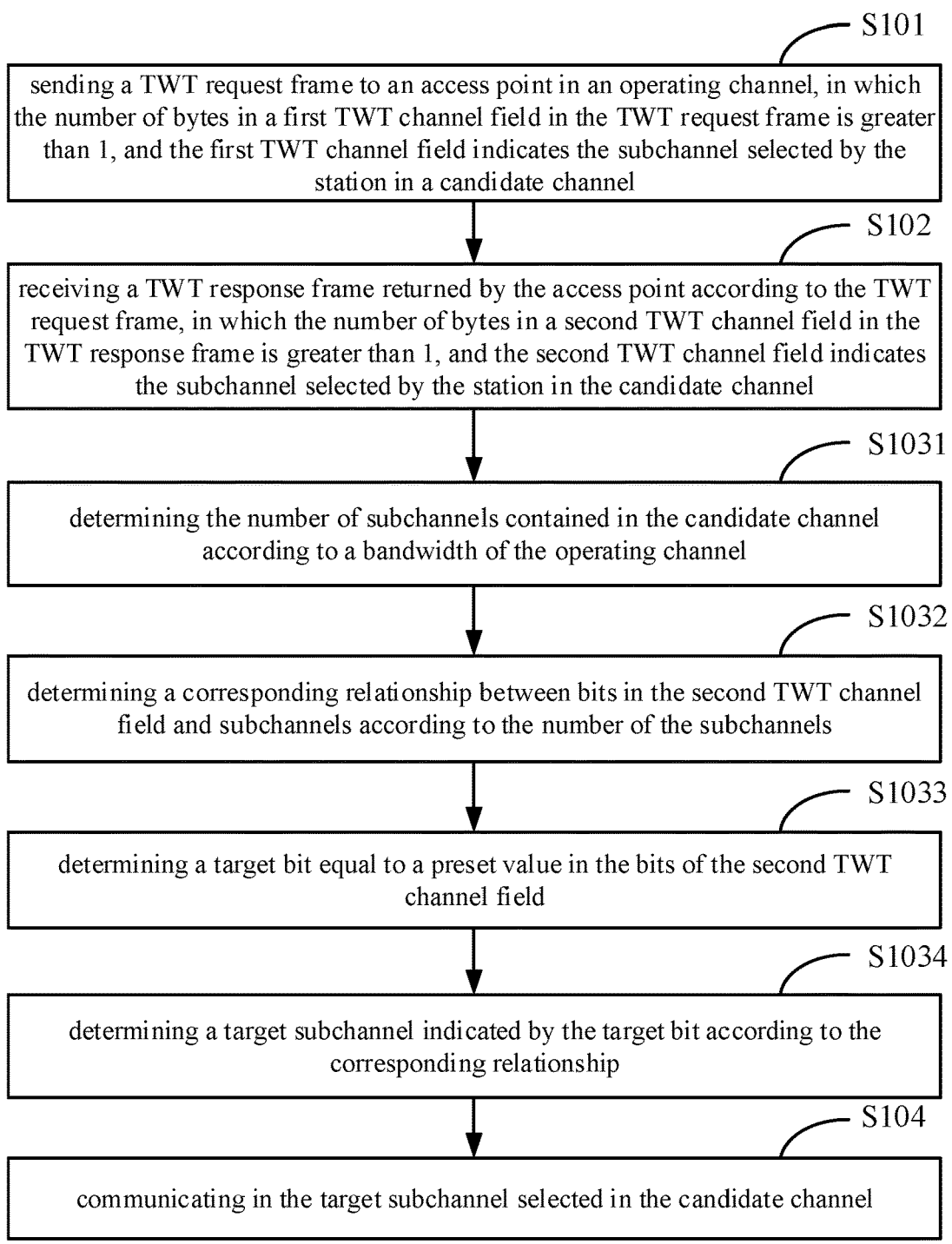
FIG. 7 is a flowchart of a method for requesting a subchannel according to a further embodiment of the present disclosure.
FIG. 8 is a flowchart of a method for indicating a subchannel implemented in an access point, according to an embodiment of the present disclosure.

FIG. 7 is a flowchart of a method for requesting a subchannel according to a further embodiment of the present disclosure. As shown in FIG. 7, the operation of determining the target subchannel selected in the candidate channel according to the second TWT channel field includes the following operations.

In block S1031, the number of subchannels contained in the candidate channel is determined according to a bandwidth of the operating channel.

In an embodiment, the bandwidth of the subchannel in the candidate channel is same as the bandwidth of the operating channel. Thus, the number of the subchannels in the candidate channel may be determined according to the bandwidth of the operating channel.

For example, if the bandwidth of the operating channel is 20 MHz, and the bandwidth of the candidate channel is 300 MHz, it may be determined that the candidate channel includes 15 subchannels with a bandwidth of 20 MHz.

In block S1032, a corresponding relationship between bits in the second TWT channel field and the subchannels is determined according to the number of subchannels.

In an embodiment, one or more bits in the second TWT channel field may correspond to at least one of the subchannels, and both the access point and the station have pre-saved the corresponding relationship.

In an embodiment, all bits of the second TWT channel field may be used to indicate the subchannels. For example, a 2-byte second TWT channel field includes 16 bits. The corresponding relationship between the bits and the subchannels may be determined as a one-to-one correspondence, that is, one of 16 bits correspond to one of 16 subchannels, respectively. Alternatively, 16 bits may be divided into 4 groups, and each group of the bits corresponds to a subchannel, respectively, and the 4 groups of the bits correspond to 4 different subchannels.

In an embodiment, some of bits designated in the second TWT channel field may be used to indicate the subchannels. For example, the 2-byte second TWT channel field includes 16 bits. One of the bits may be designated to indicate one subchannel, and the bit may correspond to a primary subchannel or a secondary subchannel, or four bits selected from the 16 bits may be designated to correspond to four different subchannels.

According to the actual situation, the corresponding relationship between the bits of the second TWT channel field and the subchannels may be determined in other manners. The above embodiments described are only examples, which shall not be construed to limit the present disclosure.

For example, the bandwidth of the operating channel is 20 MHz, and the bandwidth of the candidate channel is 300 MHz. The number of the bytes in the second TWT channel field is at least 2 bytes (that is, 16 bits), and one of the 16 bits of the second channel field may correspond to one subchannel with a bandwidth of 20 MHz, respectively. Here, the subchannels include the operating channel and the subchannels in the candidate channel.

In block S1033, a target bit that is equal to a preset value is determined in the bits of the second TWT channel field.

In an embodiment, the station and the access point may pre-negotiate a preset value. For example, the preset value may be 1, or 0. In the bits in the second TWT channel field, the station may determine the target bit that is equal to the preset value.

For example, if the preset value is 1, and the second TWT channel field is "1000000000000000", it may be determined that the first bit is equal to the preset value 1.

In block S1034, a target subchannel indicated by the target bit is determined according to the corresponding relationship.

In an embodiment, according to the corresponding relationship in the operation S1032, the subchannel indicated by the target bit in the operation S1033 is determined as the target subchannel.

Optionally, the sum of the bandwidth of the operating channel and the bandwidth of the candidate channel may be 240 MHz or 320 MHz. Optionally, the bandwidth of the operating channel may be 160 MHz, 80 MHz, 40 MHz or 20 MHz.

The process for determining the target subchannel according to the second TWT channel field is introduced below with reference to some embodiments. For example, in the following embodiments, the preset value is 1, and the sum of the bandwidth of the operating channel and the bandwidth of the candidate channel is 320 MHz.

Example 1: the bandwidth of the operating channel is 20 MHz, and the bandwidth of the candidate channel is 300 MHz.

The second TWT channel field may include 16 bits, and at most one bit is set to 1, which indicates that the target subchannel is the subchannel corresponding to the bit, and one or more RUs in the target subchannel are assigned to the station for communication.

Optionally, the 16 bits in the second TWT channel field may correspond to the 16 subchannels in a one-to-one correspondence and in sequence. For example, if the second TWT channel field is "1000000000000000", the second TWT channel field may indicate that the target subchannel selected is the first subchannel of 20 MHz. If the second TWT channel field is "0100000000000000", the second TWT channel field may indicate that the target subchannel selected is the second subchannel of 20 MHz, and so on.

In other embodiments, the bits may not correspond to the subchannels in sequence. For example, the second bit may correspond to the first subchannel of 20 MHz. The corresponding manner is not limited in the embodiments.

Example 2: the bandwidth of the operating channel is 80 MHz, and the bandwidth of the candidate channel is 240 MHz.

The second TWT channel field may include 16 bits. In the first 8 bits, the first 4 or the last 4 bits may be set to 1 to indicate that the target subchannel is the first subchannel of 80 MHz or the second subchannel of 80 MHz. In the last 8 bits, the first 4 or the last 4 bits may be set to 1 to indicate that the target subchannel is the third subchannel of 80 MHz or the fourth subchannel of 80 MHz. Further, one or more RUs in the target subchannel are assigned to the station for communication.

For example, the second TWT channel field is "1111000000000000", which may indicate that the target subchannel selected is the first subchannel of 80 MHz.

Example 3: the bandwidth of the operating channel is 160 MHz, and the bandwidth of the candidate channel is 160 MHz.

Optionally, the second TWT channel field may include 16 bits, and the first 8 or the last 8 bits may be set to 1 to indicate that the target subchannel is the first subchannel of 160 MHz or the second subchannel of 160 MHz, and one or more RUs in the target subchannel are assigned to the station for communication.

For example, the second TWT channel field is "1111111100000000", which indicates that the target subchannel selected is the first subchannel of 160 MHz.

Alternatively, the second TWT channel field may include 16 bits, and a designated bit may be set to indicate that the target subchannel is the first subchannel of 160 MHz or the second subchannel of 160 MHz, and one or more RUs are assigned to the stations for communication.

For example, if the designated bit is the first bit, the second TWT channel field is "1000000000000000" to indicate that the target subchannel selected is the first subchannel of 160 MHz. The second TWT channel field is "0000000000000000" to indicate the target subchannel selected is the second subchannel of 160 MHz.

It is understood that, in a related art, for a case where the maximum channel bandwidth is 160 MHz, a 1-byte TWT channel field may be used to identify a subchannel.

On this basis, the present disclosure also provides other optional implementation manners. For example, on the basis of the 1-byte TWT channel field, several supplementary bits are added to further distinguish the subchannels indicated by the 1-byte. In an embodiment, the supplementary bit may or may not belong to the TWT channel field.

In an embodiment, in order to further distinguish from the related art, other bits may be used to identify the maximum channel bandwidth of the channel to which the candidate channel belongs. For example, 2 bits may be added in the TWT channel field to indicate the maximum channel bandwidth (such as 80 MHz, 160 MHz, 240 MHz or 320 MHz) of the channel to which the candidate channel belongs, which will not be elaborated here.

For example, the supplementary bits are added according to a coding process for a maximum channel bandwidth of 160 MHz.

In an embodiment, the channel bandwidth greater than 160 MHz may be divided into no more than 8 basic subchannels, and 1 byte (i.e., 8 bits) in the TWT channel field may be used for identification. The basic subchannel may be further divided, and is identified by the supplementary bit(s) in the TWT channel field.

The maximum channel bandwidth is 320 MHz (that is, the sum of the bandwidth of the operating channel and the bandwidth of the candidate channel is 320 MHz), which is described as follows.

For example, the bandwidth of the operating channel is 20 MHz, and the above process may be as follows.

First, 320 MHz is divided into 8 basic subchannels, and a bandwidth of each basic subchannel is 40 MHz. For the 8 basic subchannels, at most one bit in the 8 bits in the TWT channel field is set to 1, which indicates that the target subchannel belongs to the basic subchannel corresponding to that bit.

Then, each basic subchannel is divided into 2 subchannels. The bandwidth of each subchannel is 20 MHz. For the two subchannels in each basic subchannel, the TWT channel field further includes one bit designated for supplementary identification. A value of this bit is 0 or 1, which indicates that the target subchannel is the first subchannel of 20 MHz or the second subchannel of 20 MHz in the 40 MHz basic subchannel.

For example, the first 8 bits in the TWT channel field are used to indicate the basic subchannels, and the 9th bit in the TWT channel field indicates the subchannel in the basic subchannel. The TWT channel field is "100000001", which may indicate that the target subchannel is the second subchannel of 20 MHz in the first basic subchannel of 40 MHz bandwidth (that is, the second subchannel of 20 MHz in the 320 MHz channel bandwidth).

For another example, the bandwidth of the operating channel is 80 MHz, and the above process is as follows.

First, 320 MHz is divided into 2 basic subchannels, and the bandwidth of each basic subchannel is 160 MHz. For the 2 basic subchannels, the first 4 bits or the last 4 bits of the 8 bits in the TWT channel field are set to 1, which indicates that the target subchannel belongs to the first basic subchannel of 160 MHz or the second basic subchannel of 160 MHz.

Then, each basic subchannel is divided into 2 subchannels, and the bandwidth of each subchannel is 80 MHz. For the 2 subchannels in each basic subchannel, the TWT channel field further includes one bit designed for supplementary identification. A value of this bit is 0 or 1, which indicates that the target subchannel is the first subchannel of 80 MHz or the second subchannel of 80 MHz in 160 MHz basic subchannel.

For example, the first 8 bits in the TWT channel field are used to indicate the basic subchannels, and the 9th bit indicates the subchannel in the basic subchannel. The TWT channel field is "111100001", which may indicate that the target subchannel is the second 80 MHz subchannel in the first basic subchannel with the 160 MHz bandwidth (that is, the second 80 MHz in the 320 MHz channel bandwidth).

In an embodiment, a channel bandwidth greater than 160 MHz may be divided into a plurality of basic subchannels, such as 8 basic subchannels that may be indicated by a 1-byte TWT channel field, and several supplementary bits may be used to identify the position of the target subchannel in the basic subchannel.

For example, the channel bandwidth of 320 MHz is divided into 8 basic subchannels, and the bandwidth of each basic subchannel is 40 MHz. For the operating channel of 20 MHz, one supplementary bit may be used. According to whether the supplementary bit is 0 or 1, the target subchannel is identified as the first 20 MHz subchannel or the second 20 MHz subchannel of the 40 MHz basic subchannel. For other cases, the supplementary bits may be used or may not be used adaptively, which will not be elaborated here.

It is understood that, the above-mentioned embodiments are only examples, and other encoding manners may also be used in practical applications, which are not limited here. For the case where the sum of the bandwidth of the operating channel and the bandwidth of the candidate channel is 240 MHz, a similar process may be used to determine the corresponding relationship between the second TWT channel field and the target subchannel, which will not be elaborated here.

In an embodiment, the operating channel and the candidate channel may belong to the same connection, or may belong to different connections. For example, the operating channel may work in a 5G frequency band, the candidate channel may belong to other frequency bands such as 2.4G or 6G to 7G, or the candidate channel may belong to the 5G frequency band.

The method for requesting the subchannel applied to the station is described as above. Based on the TWT channel field greater than 1 byte, when the station and the access point perform the TWT negotiation, for the bandwidth greater than 160 MHz, even if the bandwidth of the operating channel is small, the number of available subchannels is relatively large (e.g., more than 8 subchannels are available for the SST), the use of the first TWT channel field can still accurately indicate the subchannel selected by the station, and the access point may accurately determine the subchannel selected by the station. Moreover, the second channel field may accurately indicate the selected subchannel, and the station may accurately determine the subchannel used for communication.

It is noted that operations S1031, S1032, S1033 and S1034 in the embodiments of the present disclosure may be implemented independently, or may be performed in combination with any operation in the embodiments of the present disclosure. For example, operations S1031 and S1032 in the embodiments of the present disclosure may be performed in combination with the above-mentioned operation selected from S101, S101', S102, S104 or any combination thereof. Operations S1031, S1032, S1033, and S1034 in the embodiments of the present disclosure may or may not be implemented together. That is, these four operations may be implemented in any combination or independently, and these four operations may be implemented alone or in combination with any other operation of the embodiments of the present disclosure.

FIG. 8 is a flowchart of a method for indicating a subchannel according to an embodiment of the present disclosure. The method for indicating the subchannel shown in embodiments may be applied to an access point, and the access point includes, but not limited to, a switch and a router. The access point may communicate with a station served as a user equipment, and the station includes, but not limited to, mobile phones, tablet computers, wearable devices, sensors, Internet of Things devices and other electronic devices. In an embodiment, the station may be the station that performs the method for requesting the subchannel described in any of the above-mentioned embodiments.

As shown in FIG. 8, the method for indicating the subchannel may include the following operation.

In block S201, a TWT response frame is sent to a station in an operating channel. The number of bytes in a second TWT channel field in the TWT response frame is greater than 1 byte, and the second TWT channel field indicates the subchannel selected by the station in a candidate channel.

In some embodiments, the second TWT channel field in the TWT response frame may have any length greater than 8 bits, which is not limited to the number of bytes listed above.

In some embodiments, the access point may send the TWT response frame according to a preset rule, a protocol regulation or a received TWT request frame. That is, trigger events for triggering to send the TWT response frame include, but are not limited to, receiving a TWT request frame, a trigger event determined according to a protocol, or a trigger event based on a preset rule.

In an embodiment, the operating channel is a channel currently used by the station to communicate with the access point. In the operating channel, the station and the access point may perform the TWT interaction to negotiate which subchannel to be selected in the candidate channel. The candidate channel refers to a channel that is not the operating channel, that is, a channel not used by the station and the access point for the current communication.

In an embodiment, for the SST operation, the bandwidth of the subchannel selected in the candidate channel is same as the bandwidth of the operating channel.

In an embodiment, TWT elements included in the TWT response frame are similar to those in FIG. 2 and FIG. 3, and will not be repeated here. The number of the bytes in the second TWT channel field in the TWT response frame is greater than 1, such as 1.5 bytes (12 bits) or 2 bytes (16 bits). In some embodiments, the second TWT channel field in the TWT response frame may have any length greater than 8 bits, which is not limited to the number of bytes listed above.

In an embodiment, the number of the bytes in the second TWT channel field is same as the number of the bytes in the first TWT channel field in the above-mentioned embodiments.

In an embodiment, the TWT response frame may be a response frame returned by the access point after the access point receives the TWT request frame sent by the station.

In an embodiment, the TWT response frame may be a trigger frame actively broadcast and sent by the access point.

Figure 9:
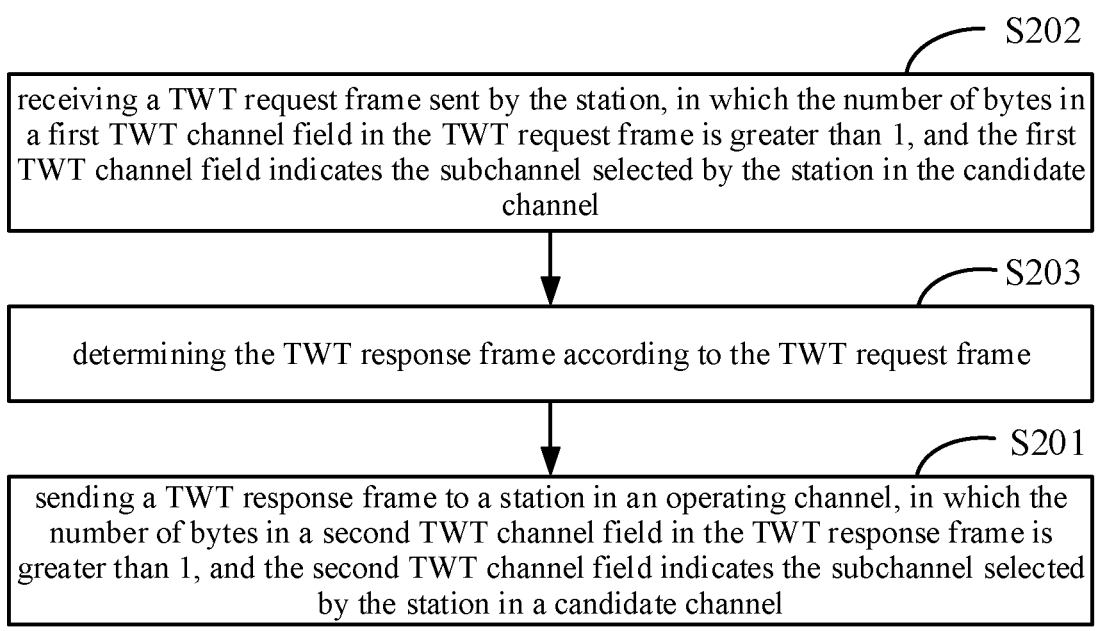
FIG. 9 is a flowchart of a method for indicating a subchannel according to another embodiment of the present disclosure.

FIG. 9 is a flowchart of a method for indicating a subchannel according to another embodiment of the present disclosure. As shown in FIG. 9, before sending the TWT response frame to the station in block S201, the method further includes the following operations.

In block S202, a TWT request frame sent by the station is received. The number of bytes in a first TWT channel field in the TWT request frame is greater than 1, and the first TWT channel field indicates the subchannel selected by the station in the candidate channel.

In block S203, the TWT response frame is determined according to the TWT request frame.

It is noted that operations S202 and S203 in the embodiment of the present disclosure may be implemented independently, or may be performed in combination with any operation in the embodiments of the present disclosure. For example, operations S202 and S203 in the embodiment of the present disclosure may be implemented together in combination with the above-mentioned operation S201, or may be implemented separately in combination with the above-mentioned operation S201.

In an embodiment, when the station negotiates with the access point, the station sends the TWT request frame to the access point. The number of the bytes in the first TWT channel field in the TWT request frame is greater than 1, and the first The TWT channel field indicates the subchannel selected by the station in the candidate channel. After the access point receives the TWT request frame sent by the station, the access point may analyze the TWT request frame, determine the TWT response frame according to the TWT request frame, and return the TWT response frame to the station.

Figure 10:
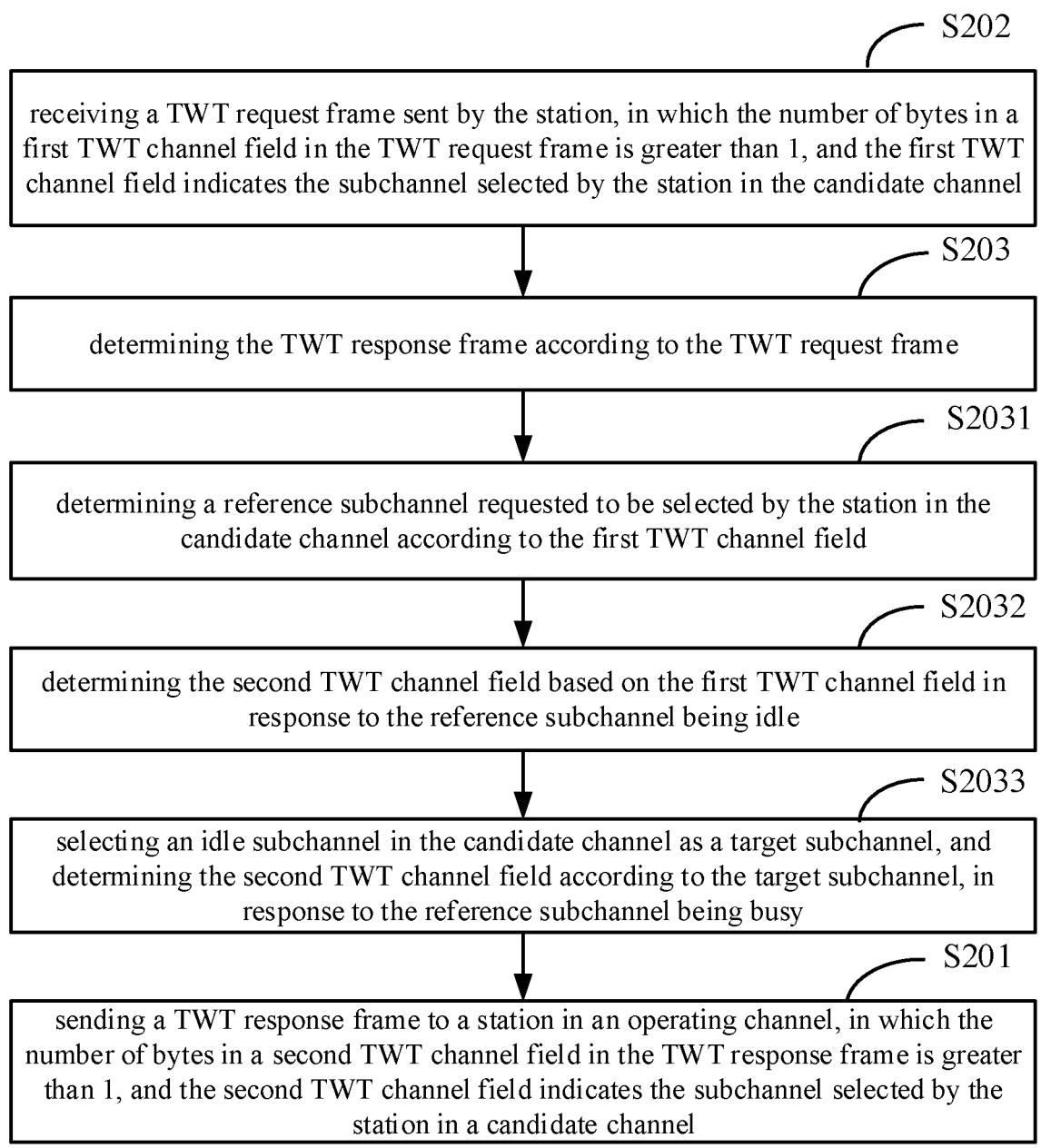
FIG. 10 is a flowchart of a method for indicating a subchannel according to a further embodiment of the present disclosure.

FIG. 10 is a flowchart of a method for indicating a subchannel according to a further embodiment of the present disclosure. As shown in FIG. 10, the operation of determining the TWT response frame according to the TWT request frame includes the following operations.

In block S2031, a reference subchannel selected by the station in the candidate channel is determined according to the first TWT channel field.

In block S2032, the second TWT channel field is determined according to the first TWT channel field in response to the reference subchannel being idle.

Alternatively, in block S2033, in response to the reference subchannel being busy, an idle subchannel in the candidate channel is selected as a target subchannel, and the second TWT channel field is determined according to the target subchannel.

It is noted that operations S2031, S2032, and S2033 in the embodiments of the present disclosure may be implemented independently, or may be performed in combination with any operation in the embodiments of the present disclosure. For example, operations S2031 and S2032 in the embodiments of the present disclosure may be performed in combination with the above-mentioned operation S201 or S202. Operations S2031, S2032, and S2033 in the embodiments of the present disclosure may or may not be implemented together, that is, these three operations may be implemented in any combination or independently, and these three operations may be implemented with any other operation of the embodiments of the present disclosure after these three operations are implemented independently or in any combination.

In an embodiment, the access point may parse the TWT request frame and determine the reference subchannel indicated by the first TWT channel field, and the reference subchannel is the subchannel requested by the station.

Figure 11:
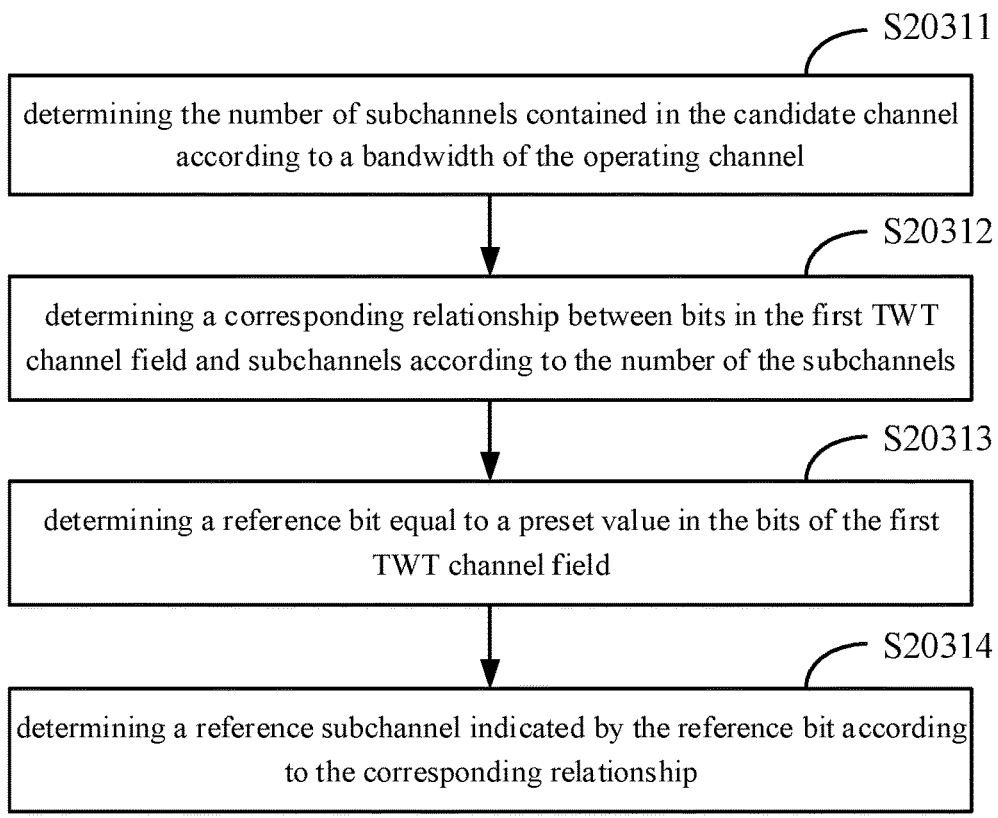
FIG. 11 is a flowchart of a method for indicating a subchannel according to a further embodiment of the present disclosure.

FIG. 11 is a flowchart of a method for indicating a subchannel according to a further embodiment of the present disclosure. As shown in FIG. 11, determining the reference subchannel selected by the station in the candidate channel according to the first TWT channel field includes the following operations.

In block S20311, the number of subchannels contained in the candidate channel is determined according to a bandwidth of the operating channel.

In an embodiment, the bandwidth of the subchannel in the candidate bandwidth is same as the bandwidth of the operating channel, and thus the number of the subchannels contained in the candidate channel may be determined according to the bandwidth of the operating channel.

In block S20312, a corresponding relationship between bits in the first TWT channel field and subchannels is determined according to the number of the subchannels.

In an embodiment, one or more bits in the first TWT channel field may correspond to individual subchannel, and both the access point and the station have pre-stored the corresponding relationship.

In block S20313, a reference bit that is equal to a preset value is determined in the bits of the first TWT channel field.

Optionally, the reference bit includes one or more bits.

In block S20314, a reference subchannel indicated by the reference bit is determined according to the corresponding relationship.

It is understood that the corresponding relationship between the bits in the first TWT channel field and the subchannels may refer to an encoding process of the TWT channel field. The encoding process in the second TWT channel field is same as the encoding process in the first TWT channel field. Based on the same encoding process, the station may decode the second TWT channel field to determine the target subchannel indicated by the second TWT channel field, and the access point may decode the first TWT channel field to determine the reference subchannel indicated by the first TWT channel field.

It should be noted that operations S20311, S20312, S20313 and S20314 in the embodiments of the present disclosure may be implemented independently, or may be performed in combination with any operation in the embodiments of the present disclosure. For example, operations S20311 and S20312 in the embodiments of the present disclosure may be performed in combination with the above-mentioned operation S2032 or S2033. Operations S20311, S20312, S20313 and S20314 in the embodiments of the present disclosure may or may not be implemented together. That is, these four operations may be implemented in any combination or independently, and these four operations may be implemented with any other operation in the embodiments of the present disclosure after these four operations are implemented alone or in any combination.

Therefore, the process that the access point determines the reference subchannel according to the first TWT channel field is similar to the process that the station determines the target subchannel according to the second TWT channel field in the embodiment shown in FIG. 7, which will not be elaborated here. Optionally, the first TWT channel field is same as the second TWT channel field, or the first TWT channel field is different from the second TWT channel field. Optionally, the channel configured to transmit the TWT request frame may be same as or different from the channel configured to transmit the TWT response frame.

In an embodiment, after the access point determines the reference subchannel, the access point may check a state of the reference subchannel. In response to the reference subchannel being idle, the access point may determine the reference subchannel as the target subchannel, and set the second TWT channel field to be same as the first TWT channel field. In response to the reference subchannel being busy, the access point may select an idle subchannel from other subchannels in the candidate channel as the target subchannel, and determine the second TWT channel field that indicates the target subchannel according to the preset coding mode.

In an embodiment, the subchannel may include a plurality of RUs. The TWT request frame sent by the station may include the number of RUs requested. In fact, the station requesting the reference subchannel refers to that the station requests to use the RUs of the reference subchannel.

In an embodiment, after the access point determines the reference subchannel, the access point may further determine whether there is an RU in an idle state in the reference subchannel. Alternatively, the access point may further determine whether the number of the RUs in the idle state satisfies the number requested by the access point. If the number of the RUs in the idle state satisfies the number requested by the access point, the reference subchannel is considered to be idle, and the reference subchannel is used as the target subchannel. If the number of the RUs in the idle state does not satisfy the number requested by the access point, the reference subchannel is considered to be busy, and another subchannel is selected from other subchannels in the candidate channel as the target subchannel.

Figure 12:
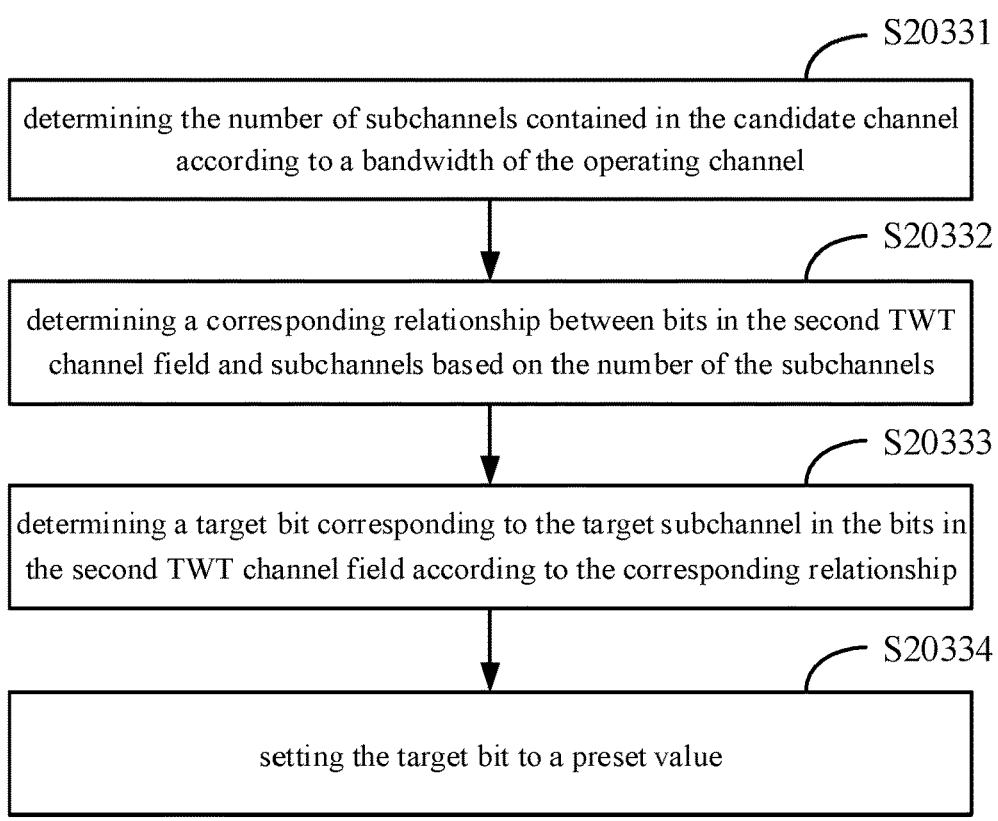
FIG. 12 is a flowchart of a method for indicating a subchannel according to a further embodiment of the present disclosure.

FIG. 12 is a flowchart of a method for indicating a subchannel according to a further embodiment of the present disclosure. As shown in FIG. 12, determining the second TWT channel field according to the target subchannel includes the following operations.

In block S20331, the number of subchannels contained in the candidate channel is determined according to a bandwidth of the operating channel.

In block S20332, a corresponding relationship between bits in the second TWT channel field and subchannels is determined according to the number of the subchannels.

In block S20333, a target bit, corresponding to the target subchannel, in the bits in the second TWT channel field is determined according to the corresponding relationship.

Optionally, the target bit includes one or more bits.

In block S20334, the target bit is set as a preset value.

It is noted that operations S20331, S20332, S20333, and S20334 in the embodiments of the present disclosure may be implemented independently, or may be performed in combination with any operation in the embodiments of the present disclosure. For example, operations S20331 and S20332 in the embodiments of the present disclosure may be performed in combination with the above-mentioned operation S2031 or S2032. The operations S20331, S20332, S20333, and S20334 in the embodiments of the present disclosure may or may not be implemented together. That is, these four operations may be implemented in any combination or independently, and these four operations may be implemented with any other operation in the embodiments of the present disclosure after these four operations are implemented alone or in any combination.

It is understood that after the access point determines the target subchannel, the second TWT channel field needs to be encoded to correspond to the target subchannel, and the corresponding relationship is the encoding manner. For example, the second TWT channel field may include 16 bits, the bandwidth of the operating channel is 20 MHz, and the bandwidth of the candidate channel is 300 MHz. In response to the target subchannel being the first subchannel of 20 MHz, it can be determined that the second TWT channel field is "1000000000000000". The process for generating the second TWT channel field according to the target subchannel is similar to the above-mentioned embodiment shown in FIG. 7, which will not be elaborated here.

In an embodiment, after the access point determines the target subchannel, the method further includes sending resource indication information to the station. The resource indication information indicates one or more resource units for communication in the target subchannel.

In an embodiment, the access point may make the TWT response frame carry the resource indication information, which indicates one or more RUs in the target subchannel assigned to the station for communication. The station may determine one or more RUs according to the resource indication information, and perform communication according to the one or more RUs.

Optionally, the sum of the bandwidth of the operating channel and the bandwidth of the candidate channel is greater than 160 MHz, such as 240 MHz or 320 MHz.

Optionally, the bandwidth of the operating channel is same as the bandwidth of the subchannel. The bandwidth of the subchannel is one of 160 MHz, 80 MHz, 40 MHz or 20 MHz.

The method for indicating the subchannel applied to the access point is described above. Based on the TWT channel field greater than 1 byte, for the bandwidth greater than 160 MHz, even if the bandwidth of the operating channel is small, the number of subchannels available for selection is relatively large (e.g., more than 8 subchannels are available for the SST), the use of the first TWT channel field can still accurately indicate the subchannel selected by the station, and the access point may accurately determine the subchannel selected by the station. Moreover, the second channel field may accurately indicate the selected subchannel, and the station may accurately determine the subchannel used for communication.

Corresponding to the above-mentioned embodiments of the method for requesting the subchannel, the present disclosure provides embodiments of an apparatus for requesting a subchannel as follows.

Figure 13:
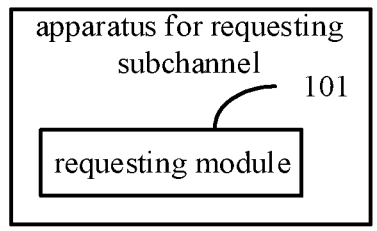
FIG. 13 is a block diagram illustrating an apparatus for requesting a subchannel according to an embodiment of the present disclosure.

FIG. 13 is a block diagram of an apparatus for requesting a subchannel according to an embodiment of the present disclosure. The apparatus for requesting the subchannel shown in embodiments may be applicable to a station, and the station includes, but is not limited to, electronic devices such as mobile phones, tablet computers, wearable devices, sensors, and Internet of Things devices. The station may serve as a user equipment to communicate with an access point, and the access point includes, but is not limited to, a switch, a router, and the like. In an embodiment, the access point may be an access point which an apparatus for indicating a subchannel described in any of subsequent embodiments is applied to.

As shown in FIG. 13, the apparatus for requesting the subchannel may include a requesting module 101.

The requesting module 101 is configured to send a TWT request frame to an access point in an operating channel. The number of bytes in a first TWT channel field in the TWT request frame is greater than 1, and the first TWT channel field indicates the subchannel selected by the station in a candidate channel.

Figure 14:
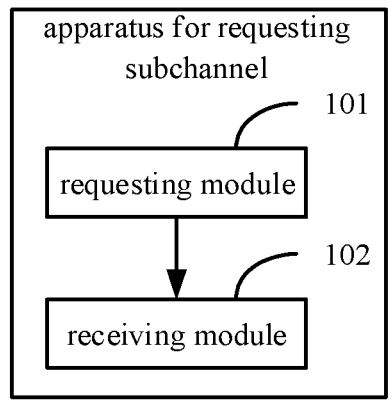
FIG. 14 is a block diagram illustrating an apparatus for requesting a subchannel according to a further embodiment of the present disclosure.

FIG. 14 is a block diagram of an apparatus for requesting a subchannel according to another embodiment of the present disclosure. As shown in FIG. 14, the apparatus further includes a receiving module 102.

The receiving module 102 is configured to receive a TWT response frame returned by the access point according to the TWT request frame. The number of bytes in a second TWT channel field in the TWT response frame is greater than 1, and the second The TWT channel field indicates the subchannel selected by the station in the candidate channel.

Optionally, the first TWT channel field is same as the second TWT channel field, or the first TWT channel field is different from the second TWT channel field.

Figure 15:
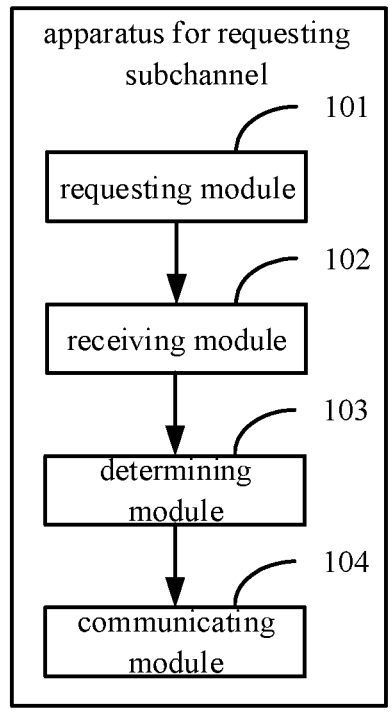
FIG. 15 is a block diagram illustrating an apparatus for requesting a subchannel according to a further embodiment of the present disclosure.

FIG. 15 is a block diagram of an apparatus for requesting a subchannel according to a further embodiment of the present disclosure. As shown in FIG. 15, the apparatus further includes a determining module 103 and a communicating module 104.

The determining module 103 is configured to determine a target subchannel selected in the candidate channel according to the second TWT channel field.

The communicating module 104 is configured to perform communication in the target subchannel selected in the candidate channel.

Optionally, the determining module 103 is configured to determine the number of subchannels contained in the candidate channel according to a bandwidth of the operating channel; determine a corresponding relationship between bits in the second TWT channel field and subchannels according to the number of the subchannels; determine a target bit that is equal to a preset value in the bits of the second TWT channel field; and determine a target subchannel indicated by the target bit according to the corresponding relationship.

Optionally, the target bit includes one or more bits.

Optionally, communicating in the target subchannel selected in the candidate channel includes determining one or more resource units in the target subchannel according to resource indication information sent by the access point; and communicating according to the one or more resource units.

Optionally, a bandwidth of the subchannel in the candidate channel is same as a bandwidth of the operating channel.

Optionally, a sum of the bandwidth of the operating channel and a bandwidth of the candidate channel is greater than 160 MHz.

Optionally, the sum of the bandwidth of the operating channel and the bandwidth of the candidate channel is one of 240 MHz or 320 MHz.

Optionally, the bandwidth of the subchannel is one of 160 MHz, 80 MHz, 40 MHz or 20 MHz.

Corresponding to the above-mentioned embodiments of the method for indicating the subchannel, the present disclosure provides an apparatus for indicating a subchannel as follows.

Figure 16:
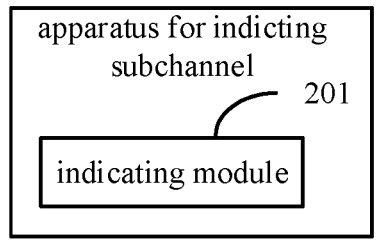
FIG. 16 is a block diagram illustrating an apparatus for indicating a subchannel according to an embodiment of the present disclosure.

FIG. 16 is a block diagram of an apparatus for indicating a subchannel according to an embodiment of the present disclosure. The apparatus for indicating the subchannel shown in embodiments may be applicable to an access point, and the access point includes, but is not limited to, a switch and a router. The access point may communicate with a station as user equipment, and the station includes, but not limited to, mobile phones, tablet computers, wearable devices, sensors, Internet of Things devices and other electronic devices. In an embodiment, the station may be a station which the apparatus for requesting the subchannel described in any of the above-mentioned embodiments is applied to.

As shown in FIG. 16, the apparatus for indicting the subchannel may include an indicating module 201.

The indicating module 201 is configured to send a TWT response frame to a station in an operating channel. The number of bytes in a second TWT channel field in the TWT response frame is greater than 1 byte, and the second TWT channel field indicates the subchannel selected by the station in a candidate channel.

Figure 17:
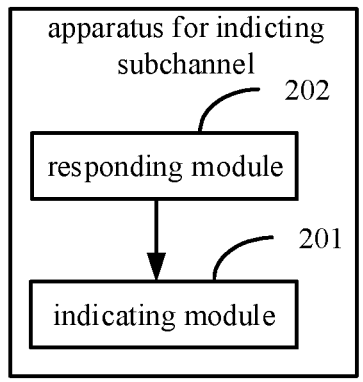
FIG. 17 is a block diagram illustrating an apparatus for indicating a subchannel according to a further embodiment of the present disclosure.

FIG. 17 is a block diagram of an apparatus for indicating a subchannel according to an embodiment of the present disclosure. As shown in FIG. 17, the apparatus further includes a responding module 202.

The responding module 202 is configured to receive a TWT request frame sent by the station, in which the number of bytes in a first TWT channel field in the TWT request frame is greater than 1, and the first TWT channel field indicates the subchannel selected by the station in the candidate channel; and determine the TWT response frame according to the TWT request frame.

Optionally, determining the TWT response frame according to the TWT request frame includes determining a reference subchannel selected by the station in the candidate channel according to the first TWT channel field; determining the second TWT channel field according to the first TWT channel field in response to the reference subchannel being idle; or selecting an idle subchannel in the candidate channel as a target subchannel, and determining the second TWT channel field according to the target subchannel, in response to the reference subchannel being busy.

Optionally, determining the reference subchannel selected by the station in the candidate channel according to the first TWT channel field includes determining the number of subchannels contained in the candidate channel according to a bandwidth of the operating channel; determining a corresponding relationship between bits in the first TWT channel field and subchannels according to the number of the subchannels; determining a reference bit equal to a preset value in the bits of the first TWT channel field; and determining a reference subchannel indicated by the reference bit according to the corresponding relationship.

Optionally, the reference bit includes one or more bits.

Optionally, determining the second TWT channel field according to the target subchannel includes determining the number of subchannels contained in the candidate channel according to a bandwidth of the operating channel; determining a corresponding relationship between bits in the second TWT channel field and subchannels according to the number of the subchannels; determining a target bit in the bits in the second TWT channel field which corresponds to the target subchannel according to the corresponding relationship; and setting the target bit to a preset value.

Optionally, the target bit includes one or more bits.

Figure 18:
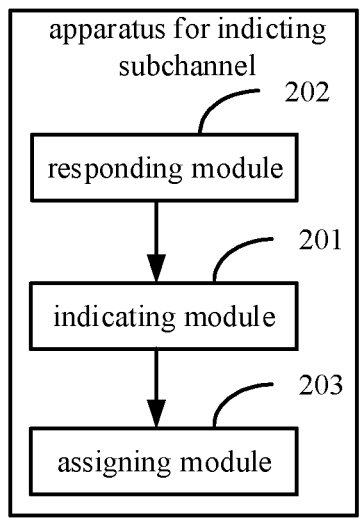
FIG. 18 is a block diagram illustrating an apparatus for indicating a subchannel according to a further embodiment of the present disclosure.

FIG. 18 is a block diagram of an apparatus for indicating a subchannel according to an embodiment of the present disclosure. As shown in FIG. 18, the apparatus further includes an assigning module 203.

The assigning module 203 is configured to send resource indication information to the station. The resource indication information indicates one or more resource units for communication in the target subchannel.

Optionally, a bandwidth of the subchannel in the candidate channel is same as the bandwidth of the operating channel.

Optionally, a sum of the bandwidth of the operating channel and a bandwidth of the candidate channel is greater than 160 MHz.

Optionally, a sum of the bandwidth of the operating channel and a bandwidth of the candidate channel is one of 240 MHz or 320 MHz.

Optionally, the bandwidth of the subchannel is one of 160 MHz, 80 MHz, 40 MHz or 20 MHz.

With regard to the apparatus in the above-mentioned embodiments, the specific manner for executing the operation in each module has been described in detail in the method embodiments, which will not be described in detail here. Since the apparatus embodiments basically correspond to the method embodiments, reference may be made on the related description of the method embodiments. The apparatus embodiments described above are only illustrative, and the modules described as separate components may or may not be physically separated, and the components shown as modules may or may not be physical modules, that is, they may be located in one place, or they may be distributed to a plurality of network modules. Part or all of the modules may be selected according to actual needs to realize the solution(s) of the embodiments in the present disclosure. The embodiments can be understood and implemented by those skilled in the art without making creative efforts.

Embodiments of the present disclosure further provide an electronic device, and the electronic device includes a processor; and a memory for storing instructions executable by the processor.

The processor is configured to implement the instructions to perform the method for requesting the subchannel in any one of the above-mentioned embodiments and/or the method for indicating the subchannel in any one of the above-mentioned embodiments.

Embodiments of the present disclosure further provide a computer-readable storage medium. The computer-readable storage medium has stored therein computer programs that, when executed by a processor, cause operations of the method for requesting the subchannel in any one of the above-mentioned embodiments and/or the method for indicating the subchannel in any one of the above-mentioned embodiments to be implemented.

Figure 19:
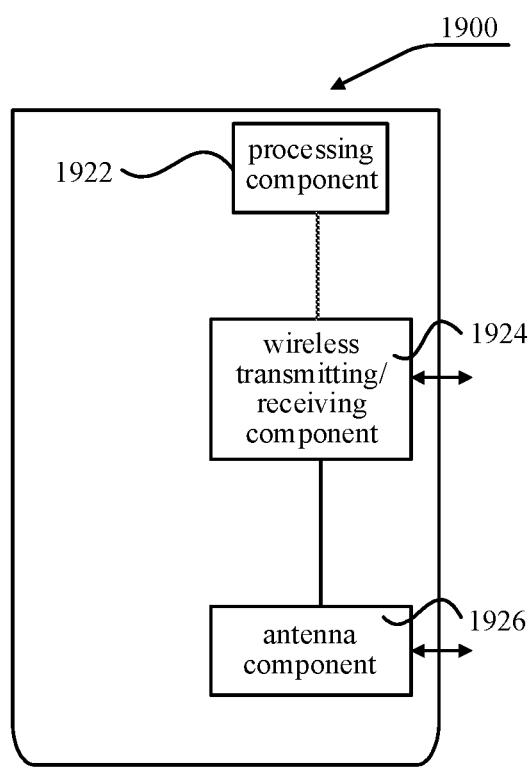
FIG. 19 is a block diagram illustrating a device for indicating a subchannel according to an embodiment of the present disclosure.

As shown in FIG. 19, FIG. 19 is a block diagram of a device 1900 for indicating a subchannel according to an embodiment of the present disclosure. The device 1900 may be provided as an access point. Referring to FIG. 19, the device 1900 includes a processing component 1922, a wireless transmitting/receiving component 1924, an antenna component 1926, and a signal processing component specific to a wireless interface. The processing component 1922 may further include one or more processors. One of the processors in the processing component 1922 may be configured to implement the method for indicating the subchannel described in any of the above-mentioned embodiments.

Figure 20:
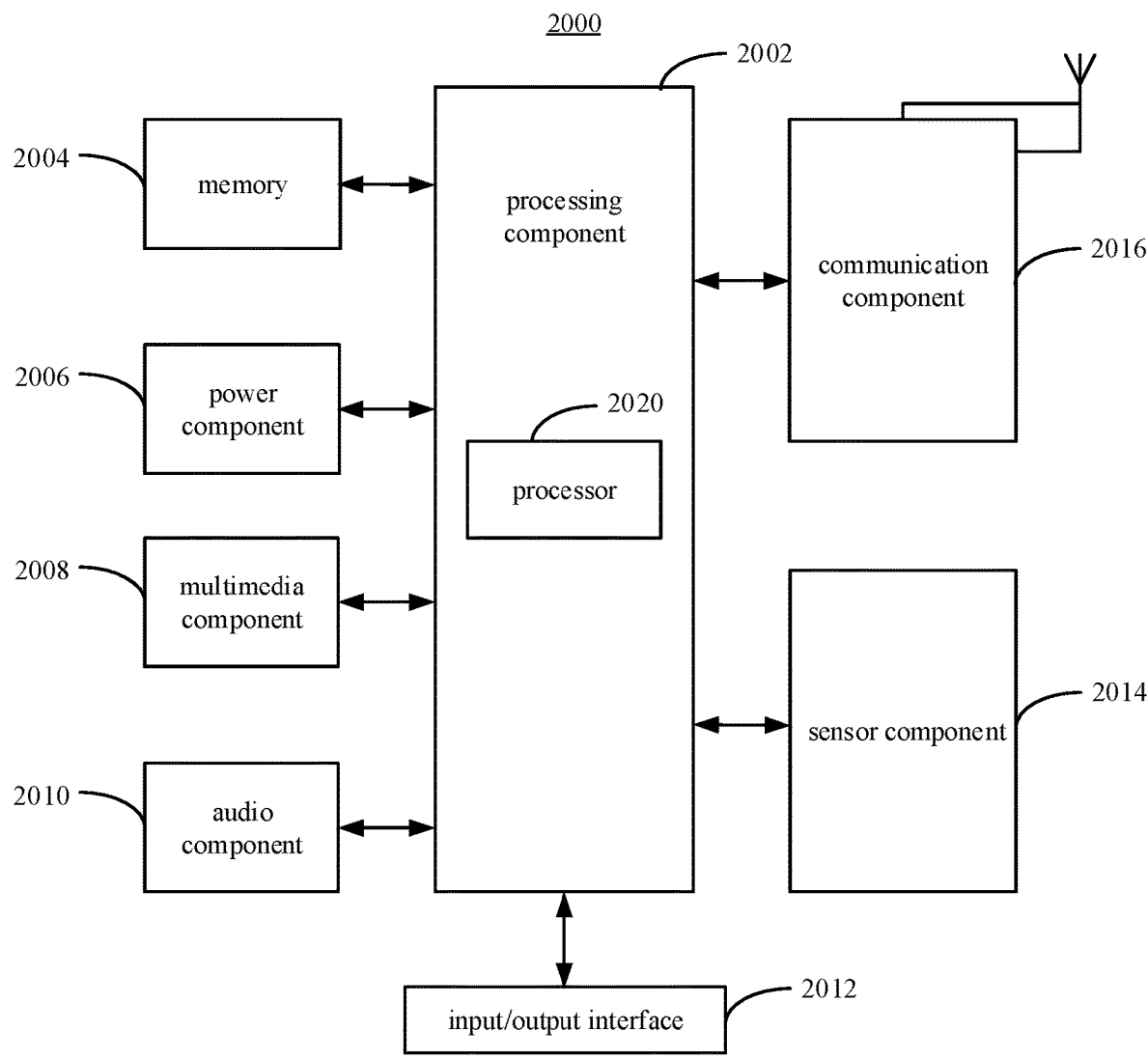
FIG. 20 is a block diagram illustrating a device for requesting a subchannel according to an embodiment of the present disclosure.

FIG. 20 is a block diagram of a device 2000 for requesting a subchannel according to an embodiment of the present disclosure. For example, the device 2000 may be a mobile phone, a computer, a digital broadcast terminal, a messaging device, a game console, a tablet device, a medical device, a fitness device, a personal digital assistant, or the like.

Referring to FIG. 20, the device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls the overall operations of the device 2000, such as the operations associated with display, telephone calls, data communications, camera operations, and recording operations. The processing component 2002 may include one or more processors 2020 to execute instructions to perform all or some of the operations of the above-mentioned method. Moreover, the processing component 2002 may include one or more modules which facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operation at the device 2000. Examples of such data include instructions for any applications or methods operated on the device 2000, contact data, phonebook data, messages, pictures, videos, and the like. The memory 2004 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 2008 includes a front camera and/or a rear camera. The front camera and/or the rear camera may receive an external multimedia datum while the device 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone (MIC) configured to receive an external audio signal when the device 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as keyboards, click wheels, buttons, and the like. The buttons may include, but are not limited to, a home button, a volume button, a starting button, and a locking button.

The sensor component 2014 includes one or more sensors to provide status assessments of various aspects of the device 2000. For example, the sensor component 2014 may detect an open/closed status of the device 2000, relative positioning of components, e.g., the display and the keypad, of the device 2000, a change in position of the device 2000 or a component of the device 2000, a presence or absence of user contact with the device 2000, an orientation or an acceleration/deceleration of the device 2000, and a change in temperature of the device 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor or a temperature sensor.

The communication component 2016 is configured to facilitate wired or wireless communication between the device 2000 and other devices. The device 2000 may access a wireless network based on a communication standard, such as WiFi, 2G, 3G, 4G LTE, 5G NR or a combination thereof. In one illustrative embodiment, the communication component 2016 receives a broadcast signal or broadcast associated information from an external broadcast management system via a broadcast channel. In one illustrative embodiment, the communication component 2016 further includes a near field communication (NFC) module to facilitate short-range communication. For example, the NFC module may be implemented based on a radio Frequency Identification (RFID) technology, an infrared data association (IrDA) technology, an ultra-wide band (UWB) technology, a Bluetooth (BT) technology and other technologies.

In illustrative embodiments, the device 2000 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component, for performing the methods described above.

In illustrative embodiments, there is also provided a non-transitory computer-readable storage medium including instructions, such as included in the memory 2004, executable by the processor 2020 in the device 2000, for performing the above-mentioned method. For example, the non-transitory computer readable storage medium may be a ROM, a random access memory (RAM), a CD-ROM, a magnetic tape, a floppy disk, an optical data storage device, and the like.

Other embodiments of the disclosure will be apparent to those skilled in the art from consideration of the specification and practice of the disclosure disclosed here. It is intended that the specification and the examples be considered as illustrative only, with a true scope and spirit of the embodiments of the present disclosure being indicated by the following claims. It is intended that the specification and the examples be considered as illustrative only, with a true scope and spirit of the embodiments of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It could be understood that in the specification, the terms "first", "second", etc. are only used to distinguish an entity or operation from another entity or operation, and do not require or imply that there is an actual relationship or order between these entities or operations. The terms "comprise", "include" or any other variation thereof are intended to cover a non-exclusive inclusion, so that a process, method, article or apparatus including a series of elements includes not only those elements but also other elements not expressly listed, or also elements inherent in the process, method, article, or apparatus. Without further limitations, an element defined by a phrase "comprising a . . . " does not exclude presence of additional identical elements in the process, method, article or apparatus including the element.

The methods and devices provided by the embodiments of the present disclosure have been described above in detail. In the specification, embodiments have been used to illustrate principles and implementations of the present disclosure. The descriptions of the above-mentioned embodiments are only used to help understand methods and core ideas of the present disclosure. At the same time, for those skilled in the art, according to the idea of the present disclosure, there will be changes in a specific implementation and an application scope. Changes may be made in the above methods and systems without departing from the scope hereof. It should thus be noted that the matter contained in the above description or shown in the accompanying drawings should be interpreted as illustrative and not in a limiting sense.

What is claimed is:

1. A method for requesting a subchannel, performed by a station, comprising:
sending a target wake time (TWT) request frame to an access point in an operating channel, wherein a number of bytes in a first TWT channel field in the TWT request frame is greater than 1, and the first TWT channel field indicates the subchannel selected by the station in a candidate channel;
wherein a bandwidth of the subchannel in the candidate channel is same as a bandwidth of the operating channel, and a sum of the bandwidth of the operating channel and a bandwidth of the candidate channel is greater than 160 MHz.

2. The method according to claim 1, further comprising:
receiving a TWT response frame returned by the access point according to the TWT request frame, wherein a number of bytes in a second TWT channel field in the TWT response frame is greater than 1, and the second TWT channel field indicates the subchannel selected by the station in the candidate channel.

3. The method according to claim 2, further comprising:
determining a target subchannel selected in the candidate channel according to the second TWT channel field; and
communicating in the target subchannel selected in the candidate channel.

4. The method according to claim 3, wherein determining the target subchannel selected in the candidate channel according to the second TWT channel field comprises:
determining a number of subchannels contained in the candidate channel according to a bandwidth of the operating channel;
determining a corresponding relationship between bits in the second TWT channel field and subchannels according to the number of the subchannels;
determining a target bit equal to a preset value in the bits of the second TWT channel field; and
determining the target subchannel indicated by the target bit according to the corresponding relationship.

5. The method according to claim 3, wherein communicating in the target subchannel selected in the candidate channel comprises:
determining one or more resource units in the target subchannel according to resource indication information sent by the access point; and
communicating according to the one or more resource units.

6. The method according to claim 1, wherein the sum of the bandwidth of the operating channel and the bandwidth of the candidate channel comprises at least one of 240 MHz or 320 MHz.

7. The method according to claim 1, wherein a bandwidth of the subchannel comprises at least one of 160 MHz, 80 MHz, 40 MHz or 20 MHz.

8. A non-transitory computer-readable storage medium having stored therein computer programs that, when executed by a processor, cause operations of the method for requesting the subchannel according to claim 1 to be implemented.

9. A method for indicating a subchannel, applied to an access point, comprising:
sending a TWT response frame to a station in an operating channel, wherein a number of bytes in a second TWT channel field in the TWT response frame is greater than 1, and the second TWT channel field indicates the subchannel selected by the station in a candidate channel;
wherein a bandwidth of the subchannel in the candidate channel is same as a bandwidth of the operating channel, and a sum of the bandwidth of the operating channel and a bandwidth of the candidate channel is greater than 160 MHz.

10. The method according to claim 9, before sending the TWT response frame to the station, further comprising:
receiving a TWT request frame sent by the station, wherein a number of bytes in a first TWT channel field in the TWT request frame is greater than 1, and the first TWT channel field indicates the subchannel selected by the station in the candidate channel; and
determining the TWT response frame according to the TWT request frame.

11. The method according to claim 10, wherein determining the TWT response frame according to the TWT request frame comprises:
determining a reference subchannel selected by the station in the candidate channel according to the first TWT channel field; and
determining the second TWT channel field according to the first TWT channel field in response to the reference subchannel being idle;
or
selecting an idle subchannel in the candidate channel as a target subchannel, and determining the second TWT channel field according to the target subchannel, in response to the reference subchannel being busy.

12. The method according to claim 11, wherein determining the reference subchannel selected by the station in the candidate channel according to the first TWT channel field comprises:
determining a number of subchannels contained in the candidate channel according to a bandwidth of the operating channel;
determining a corresponding relationship between bits in the first TWT channel field and subchannels according to the number of the subchannels;
determining a reference bit equal to a preset value in the bits of the first TWT channel field; and
determining a reference subchannel indicated by the reference bit according to the corresponding relationship.

13. The method according to claim 11, wherein determining the second TWT channel field according to the target subchannel comprises:
determining a number of subchannels contained in the candidate channel according to a bandwidth of the operating channel;
determining a corresponding relationship between bits in the second TWT channel field and subchannels according to the number of the subchannels;
determining a target bit corresponding to the target subchannel in the bits in the second TWT channel field according to the corresponding relationship; and
setting the target bit to a preset value.

14. The method according to claim 11, further comprising:

sending resource indication information to the station, wherein the resource indication information indicates one or more resource units for communication in the target subchannel.

15. The method according to claim 9, wherein a bandwidth of the subchannel comprises at least one of 160 MHz, 80 MHz, 40 MHz or 20 MHz.

16. An electronic communication device, comprising:
a processor;
a memory for storing instructions executable by the processor;
wherein the processor is configured to implement the method for indicating the subchannel according to claim 9.

17. A non-transitory computer-readable storage medium having stored therein computer programs that, when executed by a processor, cause operations of the method for indicating the subchannel according to claim 9 to be implemented.

18. An electronic communication device, comprising:
a processor;
a memory for storing instructions executable by the processor;
wherein the processor is configured to implement a method for requesting a subchannel, comprising:
sending a TWT request frame to an access point in an operating channel, wherein the number of bytes in a first TWT channel field in the TWT request frame is greater than 1, and the first TWT channel field indicates the subchannel selected by a station in a candidate channel;
wherein a bandwidth of the subchannel in the candidate channel is same as a bandwidth of the operating channel, and a sum of the bandwidth of the operating channel and a bandwidth of the candidate channel is greater than 160 MHz.

* * * * *